US006971609B2

(12) United States Patent
Seidel

(10) Patent No.: US 6,971,609 B2
(45) Date of Patent: Dec. 6, 2005

(54) ASYMMETRIC PASSENGER ARRANGEMENT

(75) Inventor: Gerhard E. Seidel, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/740,952

(22) Filed: Dec. 18, 2003

(65) Prior Publication Data

US 2005/0151013 A1 Jul. 14, 2005

(51) Int. Cl.[7] .............................................. B64D 11/06
(52) U.S. Cl. .................................... 244/118.6; 244/119
(58) Field of Search .......................... 244/118.1, 118.2, 244/118.5, 118.6, 119

(56) References Cited

U.S. PATENT DOCUMENTS

| | | | | |
|---|---|---|---|---|
| D155,362 | S * | 9/1949 | Ray | D12/195 |
| D155,777 | S * | 11/1949 | Butler | D12/195 |
| 3,009,669 | A | 11/1961 | Locke | |
| 3,155,348 | A | 11/1964 | Ricard | |
| 4,000,871 | A | 1/1977 | DeHaai | |
| 4,483,497 | A | 11/1984 | Rethorst | |
| 4,483,499 | A * | 11/1984 | Fronk | 244/118.1 |
| 4,674,713 | A * | 6/1987 | Ryan et al. | 244/122 R |
| 4,828,204 | A | 5/1989 | Friebel | |
| 5,024,398 | A * | 6/1991 | Riedinger et al. | 244/118.5 |
| 5,086,996 | A | 2/1992 | Roeder et al. | |
| 5,090,639 | A * | 2/1992 | Miller et al. | 244/118.1 |
| 5,205,515 | A * | 4/1993 | Luria | 244/118.5 |
| 5,496,000 | A * | 3/1996 | Mueller | 244/118.1 |
| 5,992,797 | A | 11/1999 | Seidel et al. | |
| 6,059,364 | A * | 5/2000 | Dryburgh et al. | 297/354.13 |
| 6,158,690 | A * | 12/2000 | Wadey et al. | 244/17.27 |
| 6,302,358 | B1 * | 10/2001 | Emsters et al. | 244/137.1 |
| 6,394,392 | B1 | 5/2002 | Lafferty | |
| 6,467,728 | B2 * | 10/2002 | Angerami et al. | 244/118.5 |
| 6,676,079 | B2 * | 1/2004 | Takeshima | 244/118.5 |
| 6,851,650 | B2 | 2/2005 | Sankrithi | |
| 2005/0001098 | A1 * | 1/2005 | Saint-Jalmes | 244/118.6 |
| 2005/0061916 | A1 * | 3/2005 | Sankrithi | 244/119 |

OTHER PUBLICATIONS

Ole T. Thomsen., "Conceptual Design Principles for Non-Circular Pressurized Sandwich Fuselage Sections—A Design Study Based on a High-Order Sandwich Theory Formulation," http://www.sagepub.co/uk/journals/details/issue/abstract/ab021468.html, published on Feb. 1, 2002.
Blohm and Voss BV 237 dimensions, http://users.visi.net/-djohnson/bv/vb237.html.
Gotha Go. VI, http://www.geocities.com/asymmetrics/go6.htm, established Aug. 22, 2000.
Me.P.1079/1 and Me.P.1079/16 models, http://www.geocities.com/asymmetrics/go6.htm.

(Continued)

*Primary Examiner*—Harvey E. Behrend
*Assistant Examiner*—S. A. Holzen
(74) *Attorney, Agent, or Firm*—Thomas F. Lebens; Fitch, Even, Tabin & Flannery

(57) ABSTRACT

An aircraft passenger seating arrangement has at least one passenger seat within an enclosure and an aisle located within the enclosure adjacent to the seat with no seats located adjacent to an opposite side of the aisle from the seat. The enclosure has a frame with a symmetrical cross section, the frame having a curved perimeter wherein the height of the cross section is different than the width to minimize cross sectional area of the aircraft body to reduce sonic boom signature.

14 Claims, 2 Drawing Sheets

A
B
C
F
E
D
105
225
220
215
230
200
210

OTHER PUBLICATIONS

Jim Sugar, "Boomerang!: Rufan's Assymetrical Twin!" Popular Mechanics, http://popularmechanics.com/science/transportation/1996/11/rutan__boomerang/print/phtml, published on Nov. 1, 1996.

Quiet Supersonic Platform, http://www.darpa.mil/tto/programs/qsp.html, last updated on Aug. 29, 2002.

"Baby Boom," Beyond 2000, http://www.beyond2000.com/news/Aug__01/story__1253.html, published on Aug. 1, 2001.

Duane Bong, "Sonic Booms," http://www.visionengineer.com/aero/supersonic__boom.shtml, established May 2000.

"Northrop to demostrate less intense sonic boom," Journal of Aerospace and Defence Industry News, http://www.aerotechnews.com/starc/2001/081001/sonic__boom.html, published on Aug. 10, 2001.

Ensign John Gay, http://www.anomalies-unlimited.com/OddPics/Images/sonicboom.jpg, posted on Jun. 9, 2002.

* cited by examiner

ASYMMETRIC PASSENGER ARRANGEMENT

BACKGROUND OF THE INVENTION

The present invention relates generally to passenger seating arrangements, and more particularly to aircraft passenger seating arrangements in supersonic jets.

A traditional subsonic jet travels at about 550 miles per hour. That is slower than the speed of sound, which is 760 mph at sea level, and approximately 660 mph at the altitudes where jets cruise (sound travels more slowly in thinner air). The air a jet displaces normally flows around the plane. But when an airplane surpasses the speed of sound, the air can no longer easily flow out of the way. Instead, the plane compresses the air as it passes through. The impact then sends a pressure pulse through the atmosphere.

The intensity of the pressure pulse decreases as it moves away from the airplane. But at the same time, the pulse changes shape, coalescing into an N-shaped wave. Within the N-wave, the pressure rises sharply, declines gradually, and then snaps back up to the normal atmospheric pressure. Meanwhile, a wall of compressed air, moving at the speed of the airplane, spreads out from the wave. As the wall of air passes over the ground, it is heard and felt as a sonic boom. The human ear picks up the pressure increases at the front and back of the N-wave, which is why the boom is often heard as a double bang.

It is possible to reduce the boom intensity by changing the shape of the airplane. For one, small planes create less of a disturbance. That is because the sonic-boom problem is caused by air displacement. Planes rest on a column of compressed air, and the lighter the plane, the lower the pressure. Shape is just as important as size. If the plane is long in proportion to its weight, the N-wave is spread across a greater distance and the peak pressure will be lower. Also, carefully tailoring the area of the fuselage cross section of a supersonic aircraft minimizes the sonic boom signature. A very long and slender fuselage is a key element for such an aircraft. Minimizing body cross-sectional area is one very desirable way of achieving that. However, a minimized aircraft body cross sectional area poses problems for traditional passenger seating arrangements because of the lack of space for an aisle way and comfortable seating.

There is thus a need in the art for a passenger seating arrangement in an aircraft having minimal aircraft body cross sectional area that provides comfortable seating for travelers and has substantial height for boarding, deplaning, and in-flight movement needed for lavatory access.

SUMMARY OF THE INVENTION

The present invention advantageously addresses the needs above as well as other needs by providing a passenger seating arrangement in an aircraft having minimal aircraft body cross sectional area that accommodates comfortable seating for travelers and has substantial height for boarding, deplaning, and in-flight movement needed for lavatory access.

In one embodiment, the invention can be characterized as an aircraft passenger seating arrangement comprising an enclosure, at least one passenger seat within the enclosure, and an aisle located within the enclosure. The aisle is located adjacent to the seat and there are no seats located adjacent to an opposite side of the aisle from the seat.

In another embodiment, the invention can be characterized as the aircraft passenger seating arrangement as described above wherein the enclosure has a frame with a symmetrical cross section. The frame has a curved perimeter wherein the height of the cross section is different than the width.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
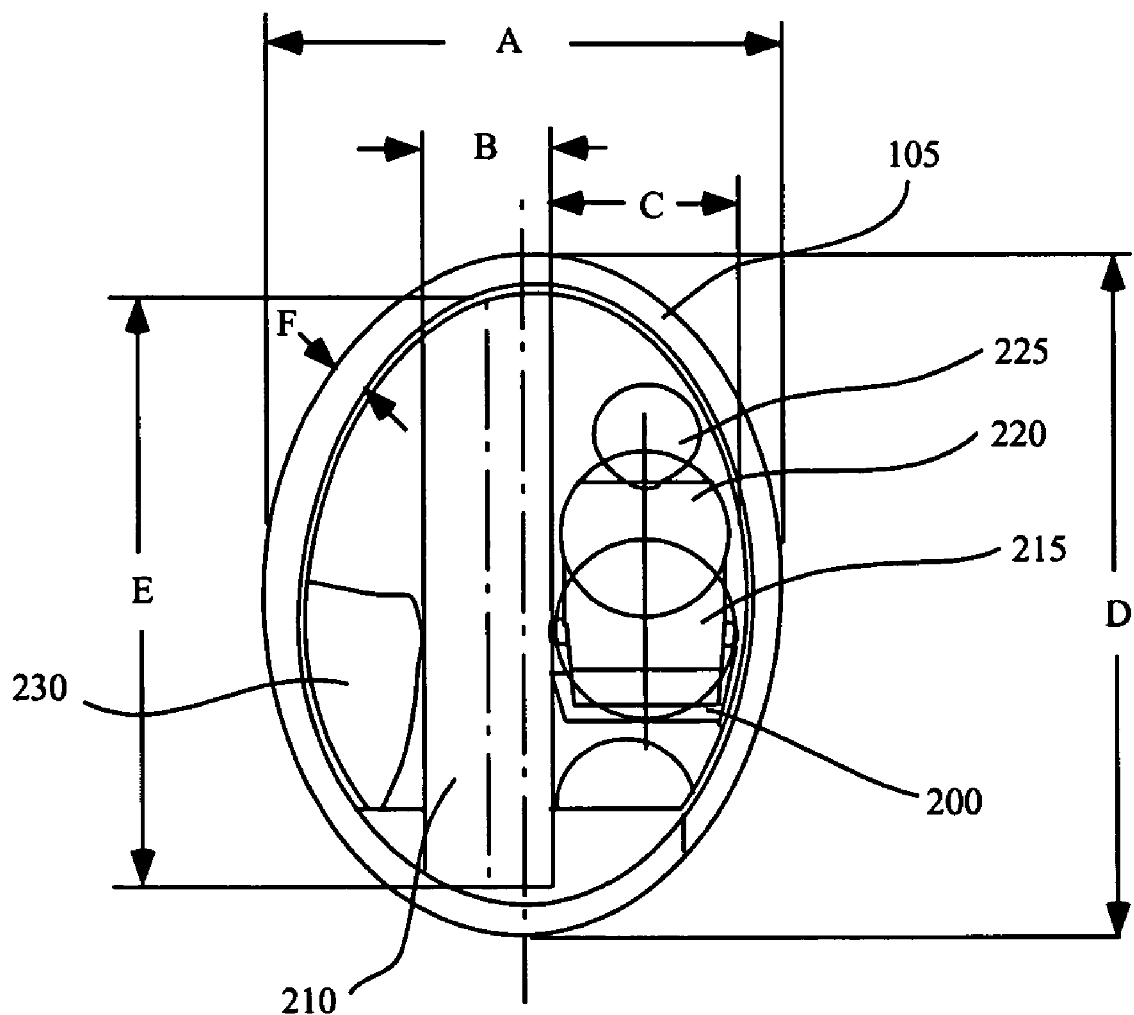
FIG. 1 is a cross sectional view of an aircraft body with a passenger seating arrangement according to an embodiment of the present invention.

Referring to FIG. 1, shown is a cross sectional view of an aircraft body with a passenger seating arrangement according to an embodiment of the present invention.

Shown is the frame of the body (or enclosure) 105, airplane passenger seating 200, an aisle way 210, sample passenger space requirements 215, 220, 225 and storage compartment 230. In the preferred embodiment, the cross section of the frame 105 has a symmetrical elliptical shape and is of composite construction, although other materials may also be used (such as metal). The frame 105 is approximately 4 inches thick F and has an outer height of approximately 91 inches D and an outer width of approximately 69 inches A (both of which will vary depending upon frame thickness). However, the curvature of the frame 105 need not be elliptical. It may be any explicit, implicit, parametric, cubic or conic curve, any combination thereof, or any other curve of varying curvature and gradation. The frame 105 preferably has a height different than the frame width such that cross sectional area of the aircraft body is minimized to reduce the sonic boom signature, but still accommodates comfortable seating 200, an aisle 210 and storage compartments 230 as shown in FIG. 1. The cross sectional area of the aircraft body is preferably smaller than an area of a circle of minimal size to accommodate the seat 200, aisle 210 and storage compartment 230 as shown in FIG. 1.

In the preferred embodiment, the height of the cross section of the frame 105 is greater than the width while accommodating the passenger seating 200, aisle 210 and storage compartments 230. The passenger seating has a seat width of approximately 25 inches C and is located on one side of an aisle 210 that is approximately 17 inches wide B. The seating also accommodates the sample passenger space requirements 215, 220, 225 in the passenger seating 200 as shown in FIG. 1. Storage compartments 230 are coupled to the frame 105 on the opposite side of the aisle 210 from the seats 200. The storage compartments 230 are designed such that they can store carry-on luggage without encroaching on the aisle 210. The storage compartment is shown attached near the bottom of the frame 105 opposite the passenger seating 200, however, it is within the scope of the present embodiment that the storage compartment 230 is located anywhere along the side of the frame 105 opposite the passenger seating 200. Preferably, wherever the storage compartment 230 is located, it does not encroach into the aisle 210. There is a comfortable aisle height (over 70 inches E) for standing in the aisle way 210. Access to aircraft body 105 side doors (not shown) and cockpit (not shown) are also present.

Other features may also be present such as, for example, windows (not shown) in the aircraft body 105, reclining seats 200, 205, skylights (not shown) located in the aircraft body 105, communication devices, light controls, air conditioning controls, and video monitors (not shown) all of which may be integrated into the seats 200, 205 and/or aircraft body 105. Other features may include an airplane lavatory (not shown), a deployable table surface stowed in the seating 200, 205, access to emergency equipment located in the aircraft body 105, and in place of the passenger seating 205, locating stowage bins (not shown) across from passenger seating 200 mounted above the aisle 210.

Figure 2:
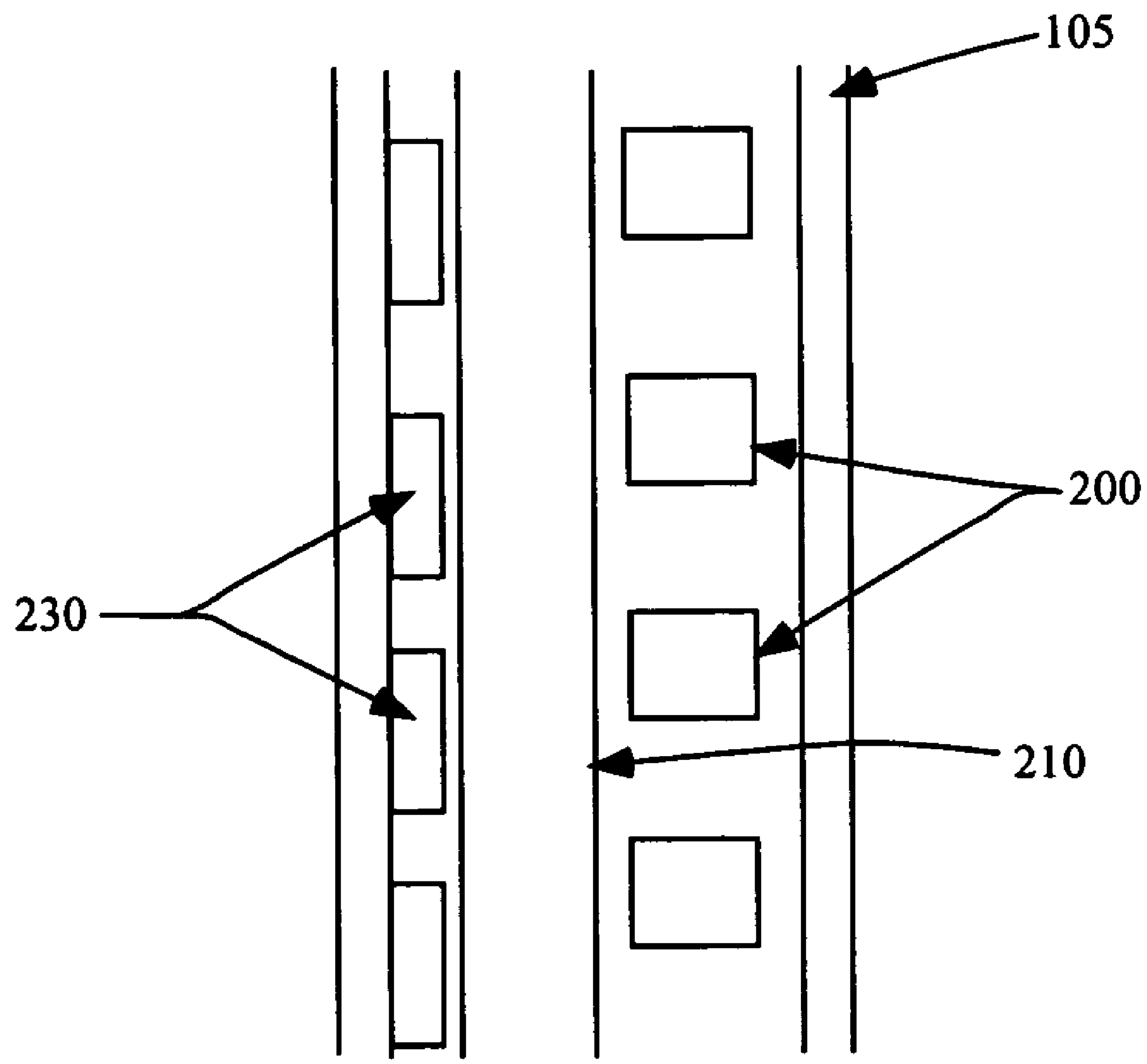
FIG. 2 is a top cross sectional view of the aircraft body and seating arrangement of FIG. 1.

Referring next to FIG. 2, shown is a top cross sectional view of the aircraft body and seating arrangement of FIG. 1. Shown is the frame 105, passenger seating 200, and storage compartments 230.

The seats 200 are located on one side of the aisle 210, while the storage compartments 230 are located on an opposite side of the aisle 210. It is within the scope of the present invention that there may be a single seat 200 and storage compartment 230 or a configuration including a plurality of seats 200 and any number of storage compartments 230. Advantageously, the seats 200 may be facing the front, side or back of the aircraft. In one embodiment, the aircraft has at least one seat 200 facing either the front, side or back the aircraft.

While the invention herein disclosed has been described by means of specific embodiments and applications thereof, numerous modifications and variations could be made thereto by those skilled in the art without departing from the scope of the invention set forth in the claims.

What is claimed is:

1. An aircraft passenger seating arrangement comprising:

an enclosure including a frame;

at least one passenger seat within the enclosure; and an aisle located within the enclosure adjacent to the seat with no seats located on an opposite side of the aisle from the seat, wherein the aisle is positioned off center from a central vertical axis of the frame;

wherein a portion of the frame has a symmetrical cross section relative to the center vertical axis with a curved perimeter;

wherein a height of the symmetrical cross section is different than a width;

wherein the symmetrical cross section has an area smaller than an area of a circle of minimal size that accommodates the seat and the aisle so that a sonic boom signature of an aircraft is reduced.

2. The aircraft passenger seating arrangement of claim 1 wherein the height of the cross section is larger than the width.

3. The aircraft passenger seating arrangement of claim 2 wherein the cross section has an elliptical shape.

4. The aircraft passenger seating arrangement of claim 2 wherein the cross section has a parametric curve.

5. The aircraft passenger seating arrangement of claim 2 wherein the cross section has a conic curve.

6. The aircraft passenger seating arrangement of claim 2 further comprising at least one storage compartment coupled to an interior of the enclosure and located adjacent to an opposite side of the aisle from the seat.

7. The aircraft passenger seating arrangement of claim 6 wherein the seat is forward facing.

8. The aircraft passenger seating arrangement of claim 6 wherein the seat is aft facing.

9. The aircraft passenger seating arrangement of claim 6 wherein the seat is forward facing and faces a forwardly adjacent seat that is aft facing in the aircraft body.

10. The aircraft passenger seating arrangement of claim 6 wherein the aisle has a height of approximately 70 inches to approximately 76 inches.

11. The aircraft passenger seating arrangement of claim 6 wherein the storage compartment is located at the bottom of the interior of the enclosure.

12. The aircraft passenger seating arrangement of claim 6 wherein the storage compartment is located at the middle side of the interior of the enclosure.

13. The aircraft passenger seating arrangement of claim 6 wherein the storage compartment is located at the top side of the interior of the enclosure.

14. The aircraft passenger seating arrangement of claim 6 wherein the cross section has an area smaller than an area of a circle of minimal size to accommodate the seat, aisle and storage compartment.

* * * * *